US011723752B2

(12) United States Patent
Broyles et al.

(10) Patent No.: US 11,723,752 B2
(45) Date of Patent: Aug. 15, 2023

(54) PACKAGED ORTHODONTIC APPLIANCES

(71) Applicant: 3M INNOVATIVE PROPERTIES COMPANY, St. Paul, MN (US)

(72) Inventors: Bruce R. Broyles, Oakdale, MN (US); Travis L. Schwalbach, Minneapolis, MN (US); Robert T. McKevett, St. Paul, MN (US); Steven J. Maxa, Lakeville, MN (US)

(73) Assignee: 3M INNOVATIVE PROPERTIES COMPANY, St. Paul, MN (US)

( * ) Notice: Subject to any disclaimer, the term of this patent is extended or adjusted under 35 U.S.C. 154(b) by 78 days.

(21) Appl. No.: 16/970,677

(22) PCT Filed: Mar. 8, 2019

(86) PCT No.: PCT/IB2019/051898
§ 371 (c)(1),
(2) Date: Aug. 18, 2020

(87) PCT Pub. No.: WO2019/175726
PCT Pub. Date: Sep. 19, 2019

(65) Prior Publication Data
US 2020/0375701 A1 Dec. 3, 2020

Related U.S. Application Data

(60) Provisional application No. 62/641,788, filed on Mar. 12, 2018.

(51) Int. Cl.
*A61C 7/28* (2006.01)

(52) U.S. Cl.
CPC .......... *A61C 7/287* (2013.01); *A61C 2202/01* (2013.01)

(58) Field of Classification Search
CPC .... A61C 7/00; A61C 7/12; A61C 7/14; A61C 7/146; A61C 7/287; A61C 2202/00;
(Continued)

(56) References Cited

U.S. PATENT DOCUMENTS

| 4,536,154 A | 8/1985 | Garton, Jr. |
| 4,978,007 A | 12/1990 | Jacobs |

(Continued)

FOREIGN PATENT DOCUMENTS

| CN | 201617965 | 11/2010 |
| EP | 1977717 | 10/2008 |

(Continued)

OTHER PUBLICATIONS

Andrews, Lawrence F., Straight Wire, The Concept and Appliance, (L.A. Wells Co., © 1989).

(Continued)

*Primary Examiner* — Amy R Sipp
*Assistant Examiner* — Sydney J Pulvidente

(57) ABSTRACT

The present disclosure provides a packaged orthodontic appliance comprising an orthodontic appliance and a packaging base including first and second tie-wing support arms, wherein a first tie-wing support arm supports the first tie-wing of the orthodontic appliance, and the second tie-wing support arm supports the second tie-wing of the orthodontic appliance.

18 Claims, 9 Drawing Sheets

(58) Field of Classification Search
CPC ... A61C 2202/01; A61C 2202/03; A61C 3/00; A61B 19/02; B65D 5/5213
USPC .................................. 206/63.5, 368, 369
See application file for complete search history.

(56) References Cited

U.S. PATENT DOCUMENTS

| | | | |
|---|---|---|---|
| 5,015,180 A | 5/1991 | Randklev | |
| 5,078,596 A | 1/1992 | Carberry | |
| 5,254,002 A | 10/1993 | Reher | |
| 5,322,435 A | 6/1994 | Pletcher | |
| 5,366,372 A | 11/1994 | Hansen | |
| 5,429,229 A | 7/1995 | Chester | |
| 5,728,439 A * | 3/1998 | Carlblom | C08J 7/048 229/87.01 |
| 6,089,861 A * | 7/2000 | Kelly | A61C 7/12 433/17 |
| 6,183,249 B1 | 2/2001 | Brennan | |
| 6,648,638 B2 | 11/2003 | Castro | |
| 7,137,812 B2 | 11/2006 | Cleary | |
| 7,335,020 B2 | 2/2008 | Castner | |
| 7,785,101 B2 | 8/2010 | Forster | |
| 7,909,603 B2 | 3/2011 | Oda | |
| 8,469,704 B2 | 6/2013 | Oda | |
| 8,636,508 B2 | 1/2014 | Forster | |
| 9,480,540 B2 | 11/2016 | Cinader, Jr. | |
| 9,539,065 B2 | 1/2017 | Cinader, Jr. | |
| 2003/0196914 A1 | 10/2003 | Tzou | |
| 2003/0198913 A1 | 10/2003 | Cinader, Jr. | |
| 2005/0239012 A1 | 10/2005 | Bathen | |
| 2005/0241962 A1 | 11/2005 | Tuneberg | |
| 2008/0286710 A1 | 11/2008 | Cinader, Jr. | |
| 2009/0233252 A1 | 9/2009 | Cinader, Jr. | |
| 2009/0298003 A1 | 12/2009 | Wei | |
| 2011/0086323 A1 | 4/2011 | Wessinger | |
| 2014/0038120 A1 | 2/2014 | Lin | |
| 2014/0141384 A1 | 5/2014 | Hagelganz | |
| 2014/0199648 A1 | 7/2014 | Lopes | |
| 2014/0272754 A1 | 9/2014 | Curley | |
| 2014/0295369 A1 | 10/2014 | Nobrega | |
| 2014/0299501 A1 * | 10/2014 | Kesling | A61C 19/02 206/488 |
| 2015/0017595 A1 | 1/2015 | Forster | |
| 2015/0017596 A1 | 1/2015 | Wong | |
| 2015/0017597 A1 | 1/2015 | Solano Reina | |
| 2015/0223913 A1 | 8/2015 | Yick | |
| 2015/0223914 A1 | 8/2015 | Sabilla | |
| 2016/0095675 A1 | 4/2016 | Damon | |
| 2016/0135929 A1 | 5/2016 | Sommer | |

FOREIGN PATENT DOCUMENTS

| | | | |
|---|---|---|---|
| EP | 2630932 | 8/2013 | |
| EP | 2630932 A1 * | 8/2013 | .............. A61C 7/02 |
| EP | 2730250 | 5/2014 | |
| EP | 2777599 | 9/2014 | |
| EP | 2783656 | 10/2014 | |
| EP | 2870944 | 5/2015 | |
| EP | 2891468 | 7/2015 | |
| EP | 3034030 | 6/2016 | |
| WO | WO 1996-00533 | 1/1996 | |
| WO | WO 2007-149710 | 12/2007 | |
| WO | WO 2013-055529 | 4/2013 | |
| WO | WO 2014-018095 | 1/2014 | |
| WO | WO 2014-078564 | 5/2014 | |
| WO | WO 2014-144145 | 9/2014 | |
| WO | WO 2014-158722 | 10/2014 | |
| WO | WO 2014-164779 | 10/2014 | |
| WO | WO 2015-026400 | 2/2015 | |
| WO | WO 2015-032918 | 3/2015 | |
| WO | WO 2015-042481 | 3/2015 | |
| WO | WO 2018-005072 | 1/2018 | |

OTHER PUBLICATIONS

International Search Report for PCT International Application No. PCT/IB2019/051898, dated Jun. 5, 2019, 4 pages.

* cited by examiner

PACKAGED ORTHODONTIC APPLIANCES

CROSS REFERENCE TO RELATED APPLICATIONS

This application is a national stage filing under 35 U.S.C. 371 of PCT/IB2019/051898, filed Mar. 8, 2019, which claims the benefit of Provisional Application No. 62/641,788 filed Mar. 12, 2018, the disclosure of which is incorporated by reference in its/their entirety herein.

BACKGROUND

Modern orthodontic techniques include repositioning teeth that are misaligned, too close together or otherwise mispositioned. To reposition the teeth, the teeth are connected to an arch wire that serves as a guide, urging the teeth into the desired position and orientation. To connect the teeth to the arch wire, small brackets with slots for receiving the arch wire are attached to the teeth. The preferred method of attaching brackets to a patient's teeth is by an adhesive.

Applying an appropriate amount of adhesive to the base of an orthodontic bracket can be a time consuming and tedious task for the orthodontist or his or her assistant. Too little adhesive may result in the bracket coming loose from the tooth after installation while an excessive amount of adhesive will be pushed out from between the bracket and tooth, requiring removal. Further, while two-part chemically curing adhesive systems are available for bonding orthodontic brackets to a patient's teeth, many practitioners prefer photo sensitive adhesives that are cured upon exposure to light in the visible spectrum for a relatively short period. Consequently, time is also a factor insofar as the adhesive applied to the bracket can only be exposed to visible light for a limited period before the bracket is positioned on the tooth.

To address these issues, pre-pasted orthodontic appliances were developed. Pre-pasted orthodontic appliances have an adhesive, normally a photo sensitive, light curing adhesive, applied to the base of the bracket before the bracket is packaged. Pre-pasted brackets reduce the amount of time required to install brackets on the patient's teeth by eliminating the need for the orthodontist to apply the adhesive to the bracket. Pre-pasted brackets also reduce the amount of wasted adhesive as the manufacturer can precisely control the amount and placement of the adhesive on the base of the bracket.

Various packaging for orthodontic brackets with a pre-applied adhesive are known for example, as described in: U.S. Patent Application Publication 2008/0286710 A1, "Packaged Orthodontic Appliance and Adhesive Material," PCT Published Patent Application 2014/158722 A1, "Package for Prepasted Brackets," and U.S. Patent Application Publication 2005/0241962 A1, "Packaging Systems for Pre-Pasted Orthodontic Bracket; U.S. Pat. No. 4,978,007, "Packaging Curable Materials"; U.S. Pat. No. 5,015,180, "Dental Article Containing Light-Curable Paste,"; U.S. Pat. No. 5,429,229, Packaged Dental Article"; and U.S. Pat. No. 6,183,249, "Release Substrate for Adhesive Precoated Orthodontic Appliances."

SUMMARY

Some aspects of the present disclosure provide a packaged orthodontic appliance. The packaged orthodontic appliance, comprises: an orthodontic appliance comprising: a base having a bonding surface; a body extending from the base, wherein the body includes a mesial-distally extending arch wire slot having a bottom wall; a door coupled to the body, wherein the door is movable between an open position and a closed position; and a first tie-wing including a first undercut and a second tie-wing including a second undercut; and a packaging base including first and second tie-wing support arms, wherein the first tie-wing support arm supports the first tie-wing, and the second tie-wing support arm supports the second tie-wing.

Some other aspects of the present disclosure provide another packaged orthodontic appliance. The packaged orthodontic appliance, comprises: an orthodontic appliance comprising: a base having a bonding surface; a body extending from the base, wherein the body includes a mesial-distally extending arch wire slot having a bottom wall; a channel in the body orientated generally perpendicular to the arch wire slot; a door slideably coupled to the body, wherein the door is slideable between an open position and a closed position wherein the door further includes a strut extending from a lingual surface, wherein the strut is slideably received in the channel; a first tie-wing including a first undercut and a second tie-wing including a second undercut; a bonding surface extending from the base opposite the body; and a layer of orthodontic adhesive on the bonding surface and a packaging base including first and second tie-wing support arms, wherein the first tie-wing support arm supports the first tie-wing, and the second tie-wing support arm supports the second tie-wing; wherein the door is in the open position, and the door of the orthodontic appliance is retained between the support arms, such that the orthodontic appliance is prevented from moving; wherein an arch wire can be ligated in the arch wire slot when the door is the open position, and wherein an arch wire can be retained in the arch wire slot when the door is in the closed position; wherein the first and second tie-wing support arms support the orthodontic appliance such that the layer of adhesive on the bonding surface of the orthodontic appliance does not contact the packaging base.

Some other aspects of the present disclosure provide yet another packaged orthodontic appliance, comprising: an orthodontic appliance comprising: a base having a bonding surface; a body extending from the base, wherein the body includes a mesial-distally extending arch wire slot having a bottom wall; a door slideably coupled to the body, wherein the door is slideable between an open position and a closed position; a first tie-wing including a first undercut and a second tie-wing including a second undercut, wherein the tie-wing support arms include a lift portion and a platform portion, wherein the platform portions are engaged with the tie-wing undercuts; a bonding surface extending from the base opposite the body; and a layer of orthodontic adhesive on the bonding surface; and a packaging base including first and second tie-wing support arms, wherein the first tie-wing support arm supports the first tie-wing, and the second tie-wing support arm supports the second tie-wing; wherein the door is in the open position, and the door of the orthodontic appliance is retained between the support arms, such that the orthodontic appliance is prevented from moving; wherein an arch wire can be ligated in the arch wire slot when the door is the open position, and wherein an arch wire can be retained in the arch wire slot when the door is in the closed position; wherein the first and second tie-wing support arms support the orthodontic appliance such that the layer of adhesive on the bonding surface of the orthodontic appliance does not contact the packaging base; and a preformed plastic substrate including a plurality of cavities for receiving a plurality of the packaging bases with the orthodontic appliances supported therein, wherein each cavity includes retention ribs to engage with the packaging base; wherein the force to remove the orthodontic appliance from the tie-wing support arms is less than the force to retain the packaging base within the cavity, when the door is in the open position.

DETAILED DESCRIPTION

The sections below describe illustrative embodiments directed to self-ligating orthodontic appliances and methods related thereto. These embodiments are exemplary and accordingly should not be construed to unduly limit the invention. For example, it is to be understood that one of ordinary skill can adapt the disclosed appliances and methods for attachment to either the labial or lingual surfaces of teeth, to different teeth within the same dental arch (for example, corresponding appliances on mesial or distal surfaces of the dental arch), or to teeth located on either the upper or lower dental arches.

The appliances described herein may optionally be customized to the individual patient undergoing treatment. Material and dimensional specifications could also vary from those disclosed herein without departing from the scope of the claimed invention. Unless otherwise specified, the provided appliances and components could be constructed of any of a variety of metal, ceramic, polymeric, and composite materials known to those skilled in the art. Further, unless otherwise indicated, dimensions associated with the appliances and their components are not critical and the accompanying drawings are not necessarily drawn to scale.

Figure 1:
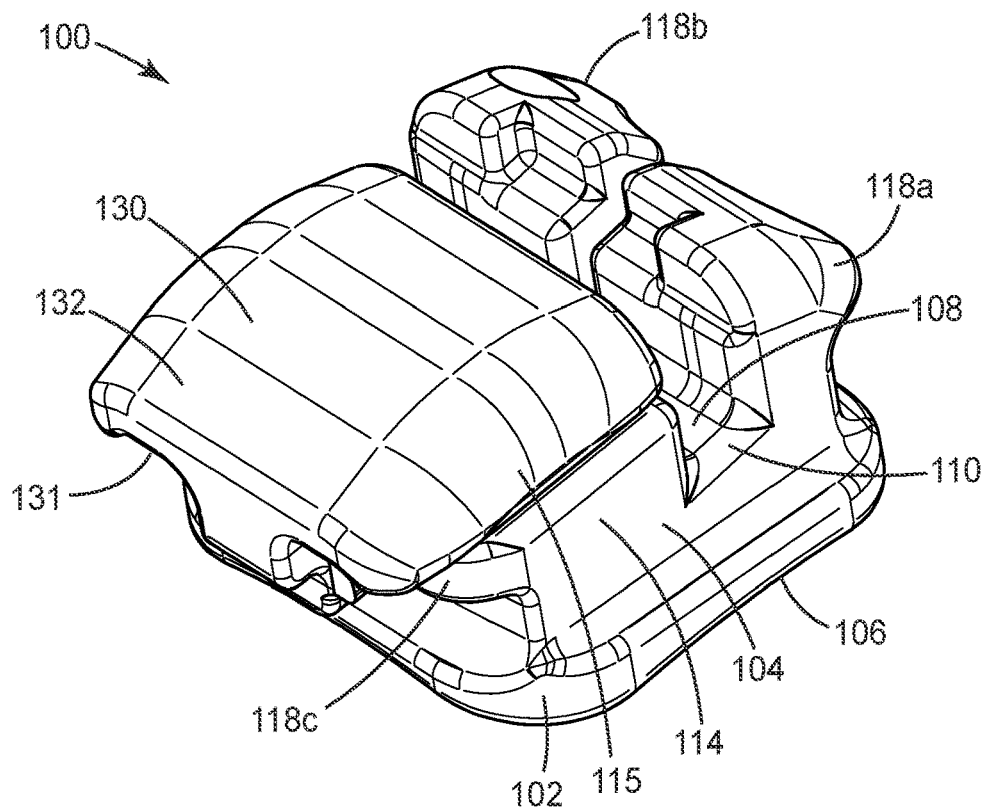
FIG. 1 is a perspective view of one embodiment of an orthodontic appliance, looking toward its facial, occlusal, and mesial sides.
Figure 2A:
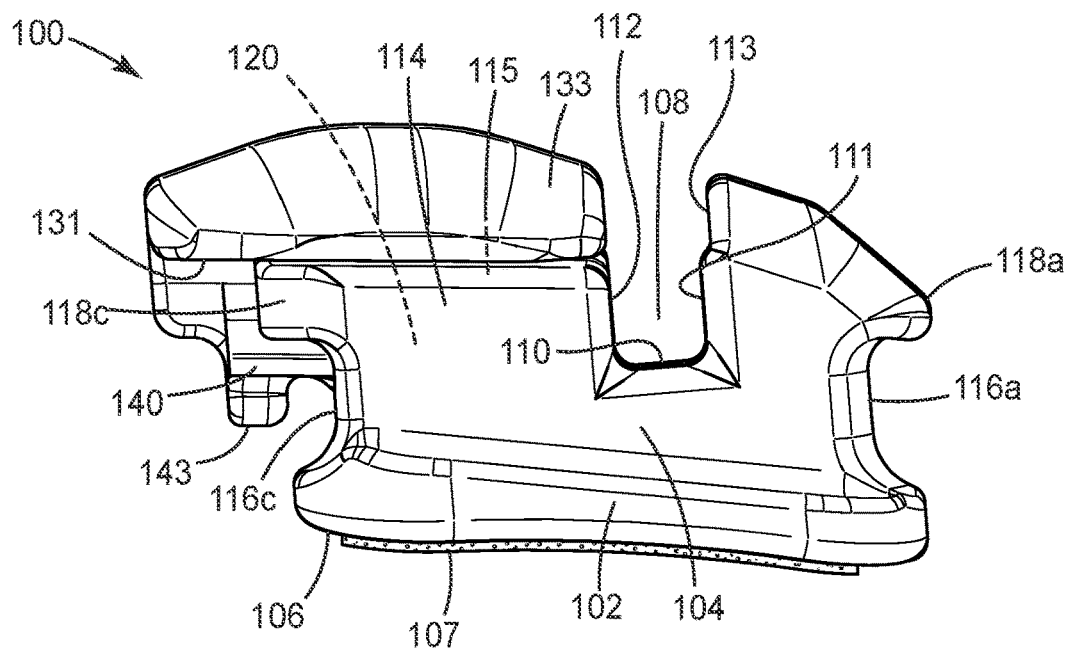
FIG. 2A is a side view of the appliance of FIG. 1, looking toward its mesial side with the door in an open position.
Figure 2B:
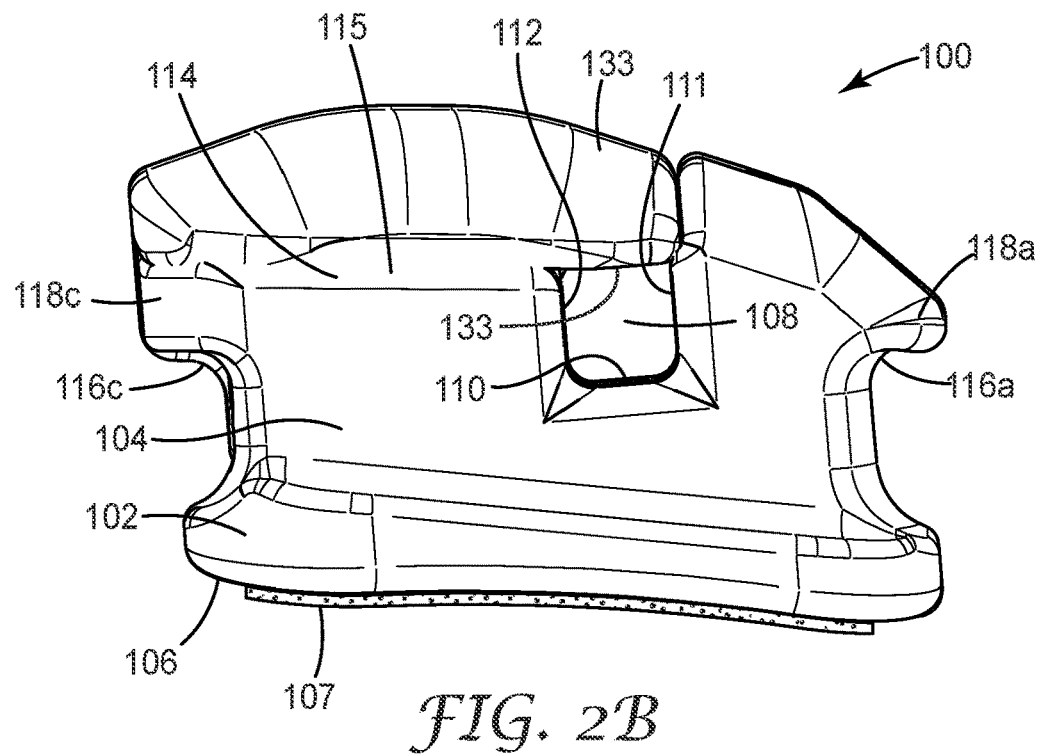
FIG. 2B is a side view of the appliance of FIG. 1, looking toward its mesial side with the door in a closed position.

An orthodontic appliance according to one embodiment, designated by the numeral 100, is shown in FIGS. 1, 2A, and 2B in assembled form. The appliance 100 has a base 102 and a body 104 extending upwardly from the base 102. The bottom of the base 102 has a bonding surface 106 having a concave, three-dimensional, surface contour generally approximating that of a respective tooth to which the appliance 100 is to be bonded.

The appliances 100 are pre-coated with a suitable orthodontic adhesive 107 and then packaged in a container or a series of cavities, as described below relative to FIGS. 3-8. The layer of adhesive 107 is coated on the bonding surface 106 of the base 102. In certain embodiments, the bonding surface 106 may feature a compound contour, with curvature in both the mesial-distal and occlusal-gingival direction. One example of a suitable orthodontic adhesive is disclosed in U.S. Pat. No. 9,480,540, "Bondable Dental Assemblies and Methods Including a Compressible Material" and U.S. Pat. No. 9,539,065, "Assemblies, Methods, and Kits include a Compressible Material", both of which are hereby incorporated by reference.

The orthodontic appliance 100 of this embodiment, unless otherwise indicated, are described herein using a reference frame attached to a labial surface of a tooth on the upper or lower jaw. Consequently, terms such as labial, lingual, mesial, distal, occlusal, and gingival used to describe the orthodontic appliance 100 are relative to the chosen reference frame, for instance, whether it is on the upper or lower jaw. As used herein "mesial" means in a direction toward the center of the patient's curved dental arch. "Distal" means in a direction away from the center of the patient's curved dental arch. "Occlusal" means in a direction toward the outer tips of the patient's teeth. "Gingival" means in a direction toward the patient's gums or gingiva. "Facial" means in a direction toward the patient's lips or cheeks. "Lingual" means in a direction toward the patient's tongue. For the embodiment shown in the drawings, orthodontic appliance 100 as illustrated is for use on the upper teeth. As such the door 130 opens preferably by pushing the door in the occlusal direction, as one looks at the teeth from the labial direction. An orthodontic appliance 100 for use on the lower jaw, the door 130 is opened preferably by pushing the door in the gingival direction, as one looks at the teeth from the labial direction.

The embodiments, however, are not limited to the chosen reference frame and descriptive terms, as the orthodontic appliance 100 may be used on other teeth and in other orientations within the oral cavity. For example, the orthodontic appliance 100 may also be coupled to the lingual surface of the tooth. Those of ordinary skill in the art will recognize that the descriptive terms used herein may not directly apply when there is a change in reference frame. Nevertheless, the embodiments are intended to be independent of location and orientation within the oral cavity and the relative terms used to describe embodiments of the orthodontic bracket are to merely provide a clear description of the embodiments in the drawings.

An arch wire slot 108, having a generally rectilinear configuration, extends in a generally mesial-distal direction across a generally facial-facing surface of the body 104. Referring particularly to the distal view in FIG. 2A, the arch wire slot 108 includes a bottom, lingual wall 110 along with gingival and occlusal side walls 111, 112. The gingival wall 111 is at least partially defined by surfaces of door support sections 114 on the occlusal side of body 104. An arch wire (not shown) is received in the arch wire slot 108 and typically has a generally rectangular cross-section that substantially corresponds with walls 110, 111, 112 of the arch wire slot 108. A close correspondence between the dimensions of the arch wire and the arch wire slot 108 can provide for a precise coupling between the arch wire and appliance 100, giving the treating practitioner a high degree of control over the movement of teeth. It should be appreciated, however, that other arch wire geometries can be used that do not closely approximate the dimensions of the slot walls.

Figure 6:
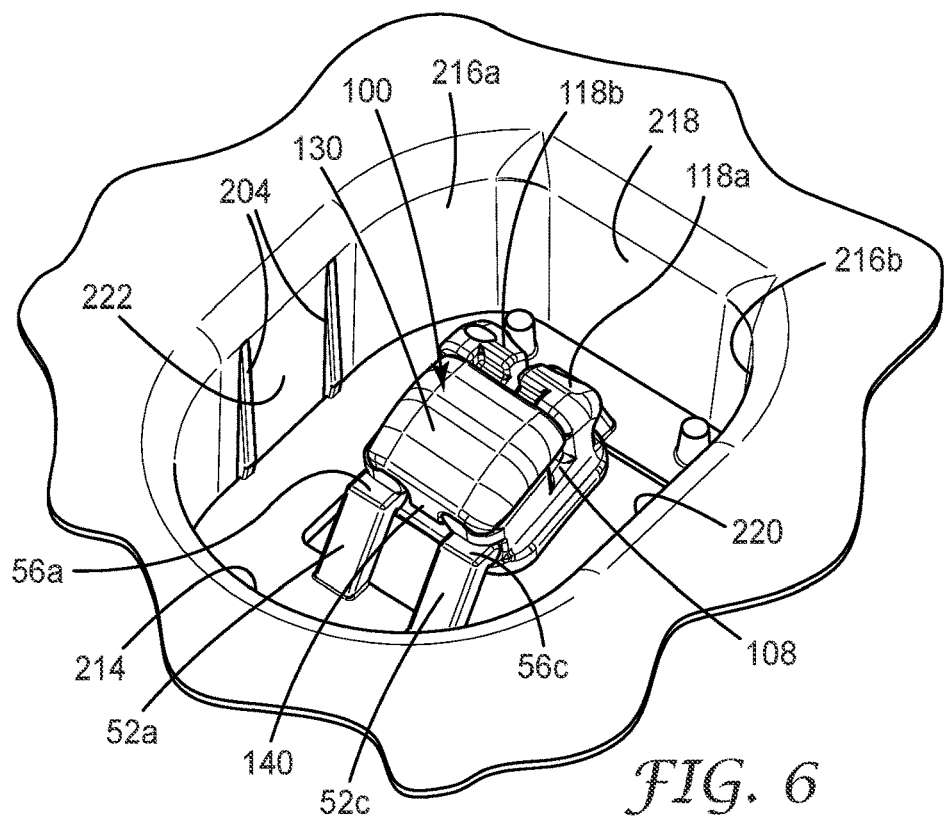
FIG. 6 is an enhanced view of one of the packaged orthodontic appliance of FIG. 5B, where the door is in the closed position.

A door 130, slidably received in the body 104, controls access to the arch wire slot 108 and is shown in its closed position in FIGS. 2B and 6. A portion of the door 130 extends across a central portion of the arch wire slot 108, thereby preventing ingress or egress of an arch wire (not shown here) with respect to the slot 108 of the appliance 100. In the configuration shown, the arch wire would be securely ligated to the appliance 100 such that the arch wire will not become accidently dislodged because of normal chewing and brushing activity that occurs in a patient's mouth. The door 130 can slide in both occlusal and gingival directions to toggle between an open position allowing access to the arch wire slot 108 (depicted in FIGS. 1, 2A, and 6-8) and the closed position. The arch wire can, and typically should, slide along the length of the arch wire slot 108, thereby allowing the arch wire to function as a track that guides the movement of malocclueded teeth. Such sliding is especially prominent as the teeth unravel during the leveling and aligning stages of treatment.

Under most circumstances, the door 130 is adequate on its own to ligate an arch wire to the appliance 100. If desired, however, a treating professional can elect to manually ligate the arch wire with the assistance of the undercuts 116 and tie-wings 118 located on the body 104. Ligation can be achieved, for example, by securing an elastomeric O-ring or ligature wire beneath the undercuts 116a, 116b, 116c, over an arch wire received in the slot 108, and beneath the tie-wings 118a, 118b, 118c. The undercuts 116a, 116b, 116c and tie-wings 118a, 118b, 118c may also be used to secure a power chain to two or more teeth if so desired.

Figure 3:
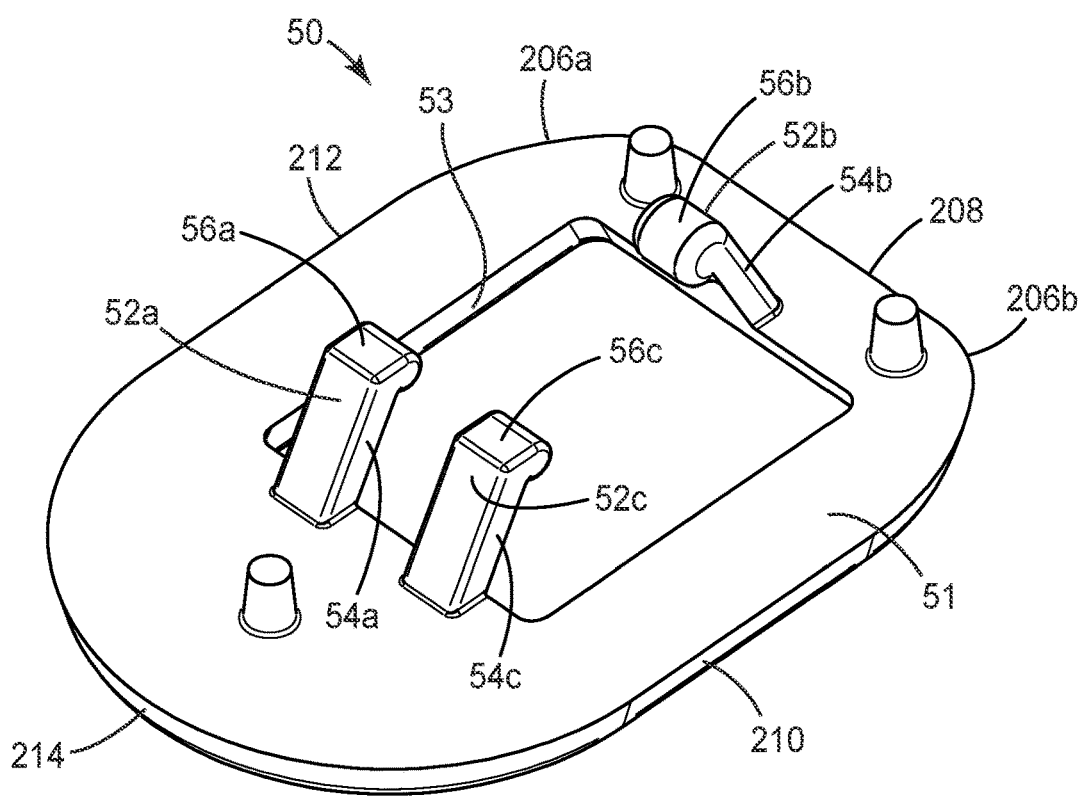
FIG. 3 is a perspective view of a packaging base according to one embodiment.

FIG. 3 shows a packaging base 50 for supporting the orthodontic appliance 100. The packaging base 50 is designed to ensure that the adhesive 107 does not contact the rest of the packaging. This configuration prevents adhesive wicking, and thus it is not necessary to overload the layer of adhesive, which was done prior to ensure the appliance still had enough adhesive on it when received by the customer. Prior packaging also included a release liner on the layer of adhesive 107. With the present design, the release liner may be eliminated, thus decreasing packaging costs.

The packaging base 50 is also configured to universally accommodate multiple designs of orthodontic appliances. Therefore, the same packaging may be used with multiple brackets of varying sizes and design, saving manufacturing and packaging costs. For example, the packaging base is configured to accommodate a self-ligating door design bracket, such as the orthodontic appliance 100 illustrated in FIGS. 1, 2A, and 2B. The packaging base 50 allows the door to be in the open position, while the appliance 100 is supported by the packaging base 50. However, the packaging base may also support other orthodontic appliance configurations.

In one embodiment, the packaging base 50 includes a base portion 51 a first tie wing support arm 52a and a second tie wing support arm 52b. The first support arm 52a and second wing support arm 52b support opposite sides of the orthodontic appliance 100. In another embodiment, the packaging base 50 includes a third tie wing support arm 52c. Each support arm has lift portion 54 (54a, 54b, 54c) and platform portion 56 (56a, 56b, 56c). The lift portions 54a, 54b, 54c extend from the base 51, and the platform portions 56a, 56b, 56c of the tie wing support arms 52a, 52b, 52c are designed to engage with the tie wings 118a, 118b, 118c, and thus support the entire orthodontic appliance 100. The packaging base 50 may also include a hole 53 sized to accommodate the bonding surface 106 having the layer of adhesive 107. In assembling the orthodontic appliance 100 and the packaging base 50, the hole is useful for first coating the layer of adhesive 107 onto the bonding surface 106, while the orthodontic appliance 100 is being held in place by the support arms 52a, 52b, 52c of the packaging base 50. Thereafter, placing the combination of the precoated orthodontic appliance 100 and packaging base 50 into the cavity 202 in the preformed plastic substrate 200. The hole 53 is also useful to make the injection mold process easier for molding such packaging bases 50.

Preferably, the packaging base 50 is sized to fit within a packaging cavity, as discussed in further detail relative to FIG. 5. In the embodiment shown in FIG. 3, the base portion 51 has a rounded surface 214 opposite a flat surface 208. The base portion 51 also has opposing flat surfaces 210, 212. There is first rounded corner 206a and a second rounded corner 206b at opposite ends of the flat surface 208.

Figure 4:
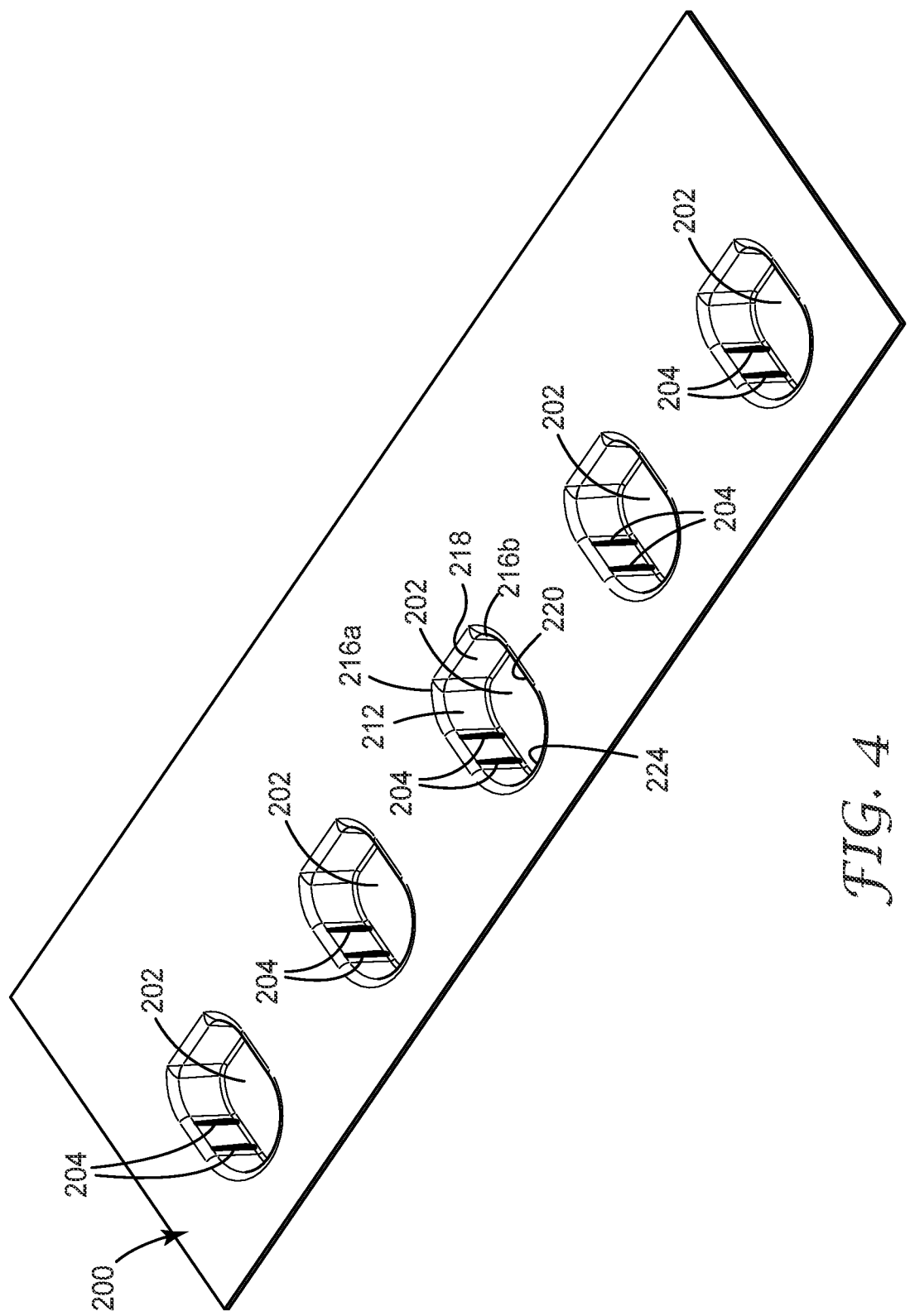
FIG. 4 is a perspective view of a preformed packaging substrate.
Figure 5A:
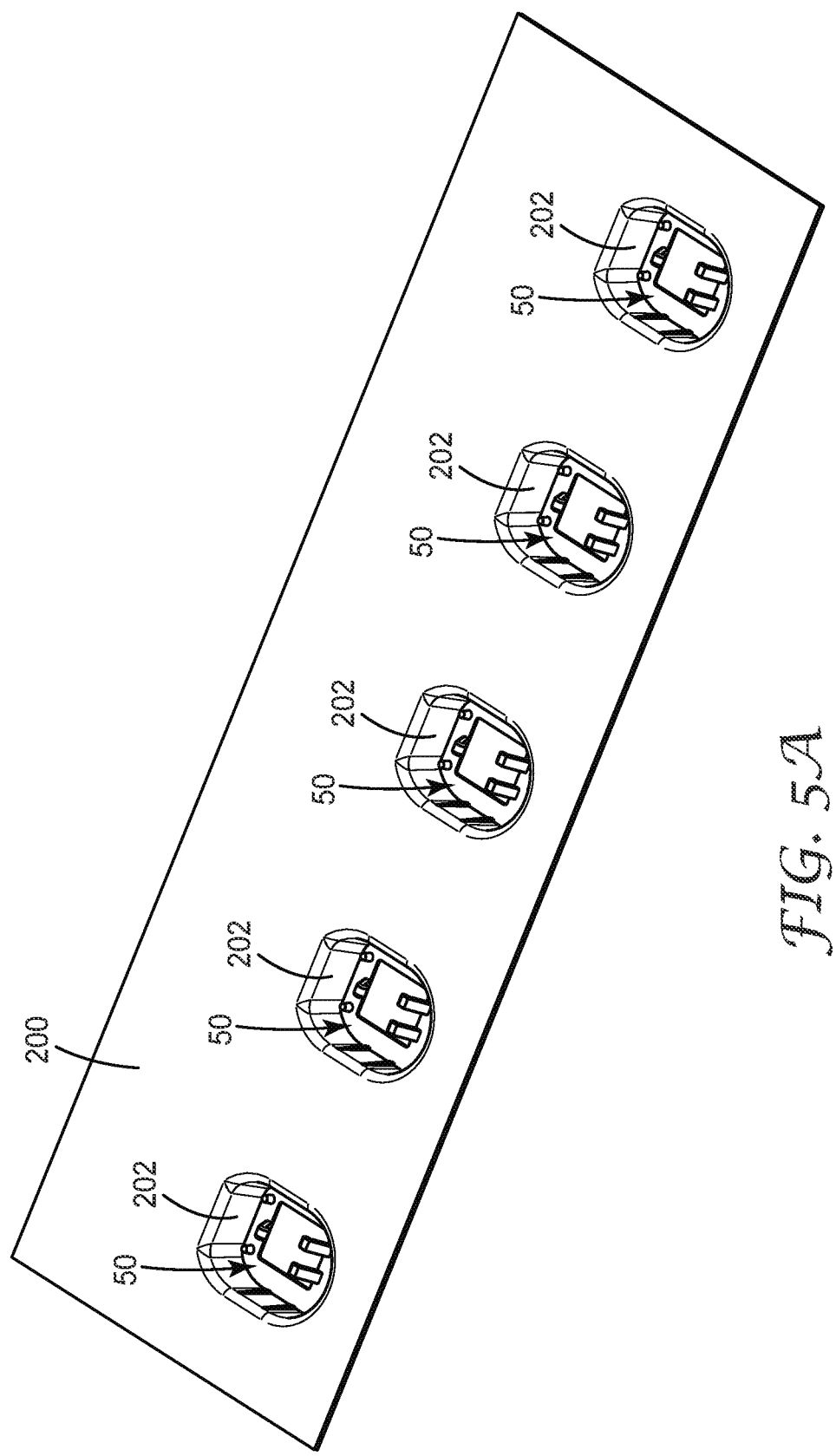
FIG. 5A is a perspective view of the preformed packaging substrate with a plurality of the packaging bases of FIG. 3 therein.

FIGS. 4 and 6 illustrate one embodiment of the packaging for the packaging bases 50 and the orthodontic appliances 100. The packaging includes a preformed substrate 200 that may be made of plastic. The substrate 200 includes a plurality of cavities 202. Each cavity 202 is sized to receive a packaging base 50, as illustrated in FIG. 5A. For example, each cavity 202 includes rounded walls 216a, 216b shaped to correspond generally to the rounded corners 206a, 206b respectively of the base portion 51. Each cavity 202 includes a straight wall 218 shaped to correspond generally to the straight portion 208 of the base portion 51. Each cavity 202 includes opposing straight walls 220, 222 shaped to correspond generally to the straight portions 210, 212, of base portion 51 respectively. Lastly, each cavity 202 includes a rounded wall 224 shaped to correspond generally to the curved portion 214 of the base portion 51. Hence, there is a tight fit between the bottom of the cavity and the packaging base 50. Moreover, this allows the packaging base 50 to only fit one way into the cavity 202.

In another embodiment, the cavity 202 may include optional retention ribs 204. The ribs 204 are positioned with two ribs on each of the walls 220, 222. The ribs 204 have an inclining plane, so that as the packaging base 50 is place into the cavity, 202 there is a very tight fit between the two at the bottom of the cavity. This is, for example, illustrated in FIG. 5A.

The preformed substrate 200 may include light blocking properties to protect the adhesive 107 from being prematurely cured. Alternatively, or in addition to, the preformed substrate 200 may have low moisture vapor transmission rate properties. In one embodiment, the substrate 200 comprises a polymer and metallic particles. As an example, the substrate 200 may be made of polypropylene that is compounded with aluminum filler or receives an aluminum powder coating as disclosed, for example, in U.S. Patent Application Publication No. 2003/0196914 (Tzou et al.). The combination of polymer and metallic particles provides a highly effective block to the passage of actinic radiation to color changing dyes, even though such dyes are known to be highly sensitive to light. Such substrates also exhibit good vapor barrier properties. As a result, the adhesive 107 is less likely to change over extended periods of time. For example, the improved vapor barrier properties of such substrates provide substantial protection against degradation of the handling characteristics of adhesives so that the adhesives do not prematurely cure or dry or become otherwise unsatisfactory. Preferably, the material of the substrate 200 is substantially opaque to the transmission of light in the range of about 400 nanometers to about 600 nanometers. This range is satisfactory for blocking passage of light that might otherwise be absorbed by the photo sensitive components of the adhesive. Also, suitable covers (not shown) for the cavities 202 can be made of any material that is substantially opaque to the transmission of actinic radiation so that the adhesives do not prematurely cure. However, broader ranges are also possible and may be desired when the adhesive 16 contains components that are sensitive to radiation outside of the range identified above. In one embodiment the substrate 200 or cover effectively blocks greater than 50% of light (actinic radiation) in the range of about 400 nanometers to about 600 nanometers. In another embodiment the substrate 200 or cover effectively blocks greater than 75% of light (actinic radiation) in the range of about 400 nanometers to about 600 nanometers. In another embodiment the substrate 200 or cover effectively blocks greater than 90% of light (actinic radiation) in the range of about 400 nanometers to about 600 nanometers. In another embodiment the substrate 200 or cover effectively blocks greater than 95% of light (actinic radiation) in the range of about 400 nanometers to about 600 nanometers.

Examples of suitable materials for covers include laminates of aluminum foil and polymers. For example, the laminate may comprise a layer of polyethyleneterephthalate, adhesive, aluminum foil, adhesive and oriented polypropylene.

Figure 5B:
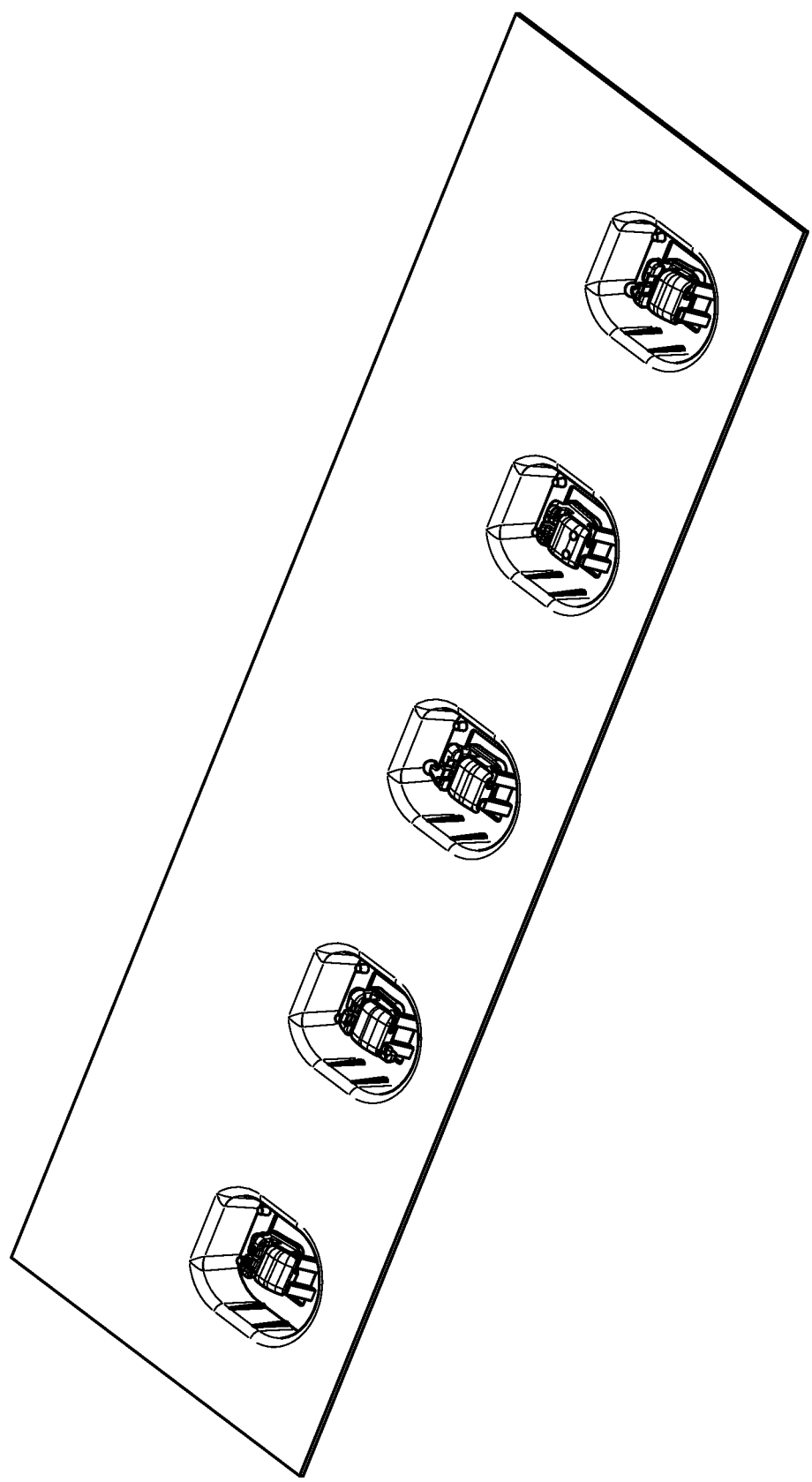
FIG. 5B is a perspective view of the preformed packaging substrate with a plurality of the packaging bases of FIG. 3 and orthodontic appliances of FIG. 1 therein, where the door is in the open position.

FIG. 5B shows a plurality of the orthodontic appliances 100 supported by the packaging bases 50 in the cavities 202. The orthodontic appliances 100 each have their door 130 in an open position, ready for use by the practitioner. The preformed substrate 200 may optionally be covered with a sealing or cover (not shown) that is preferably impermeable to light or moisture, which is adhered to the substrate 200, and provides a covering over the tops of the cavities 202.

Figure 7:
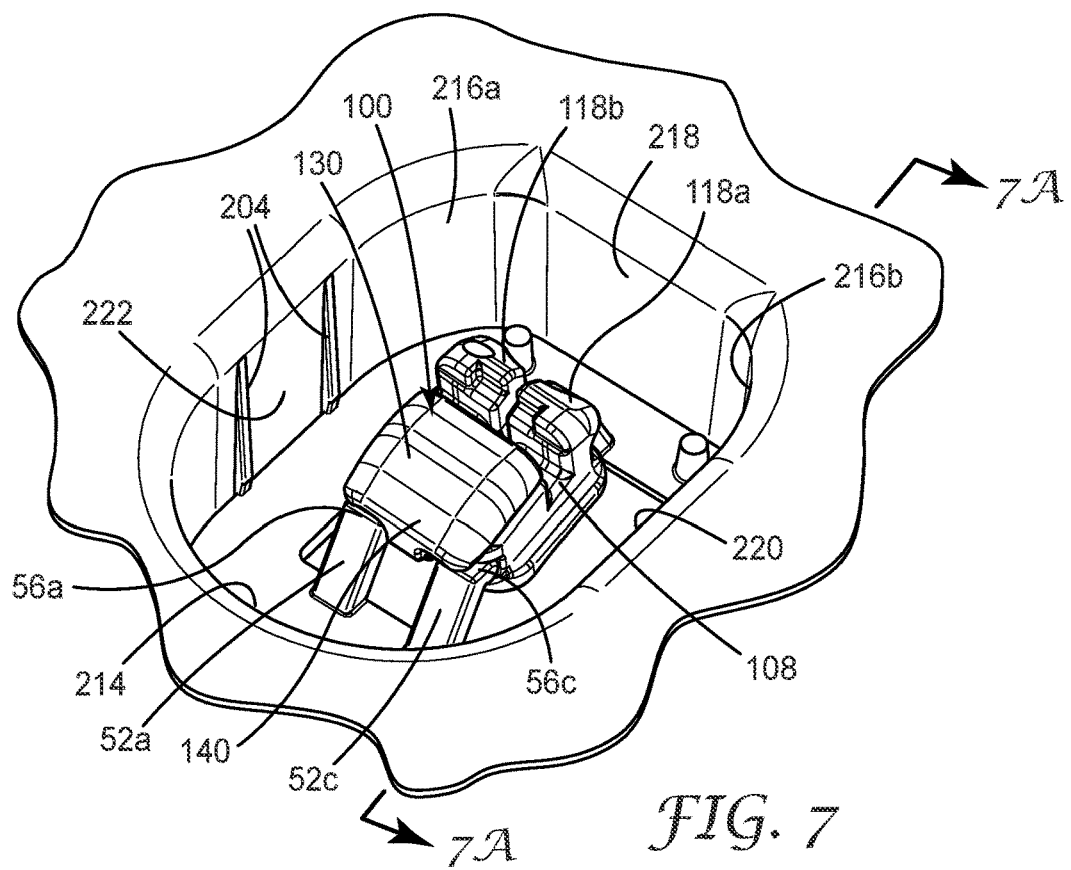
FIG. 7 is a perspective view of the packaged orthodontic appliance of FIG. 6, where the door is in the open position.
Figure 7A:
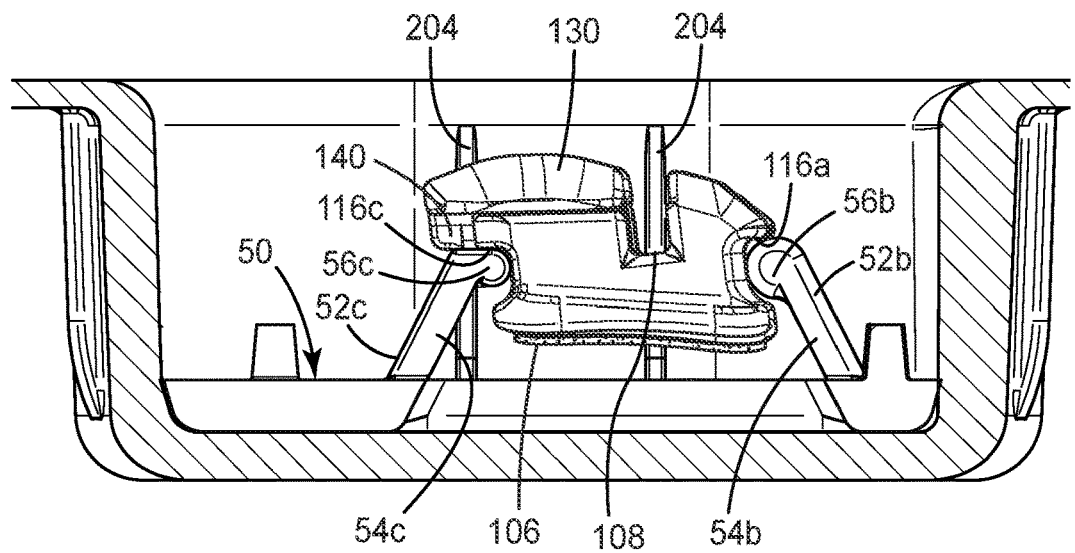
FIG. 7A is a side view along line 7A-7A of FIG. 7, which is convenient for showing the packaged orthodontic appliance.
Figure 8:
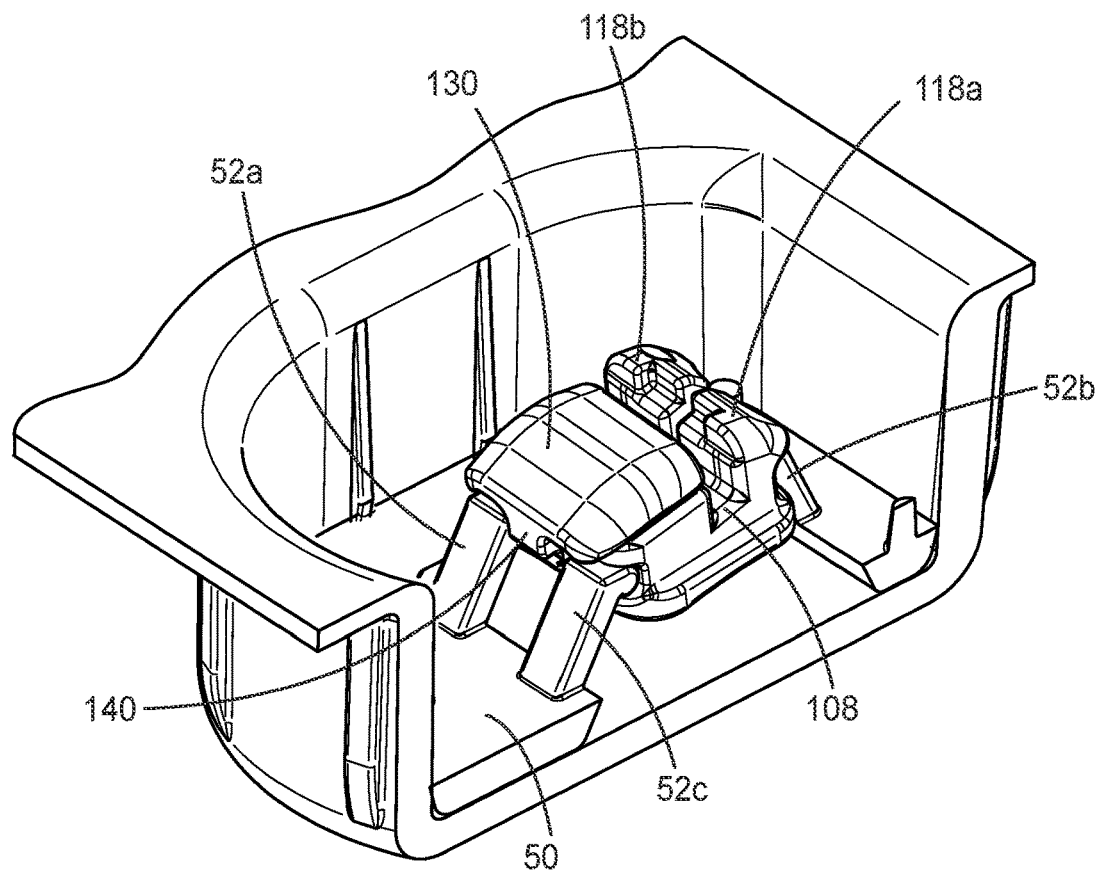
FIG. 8 is a perspective view of the packaged orthodontic appliance of FIG. 7A.

FIGS. 7, 7A, and 8 are convenient for illustrating how the packaging base 50 within the cavity 202 supports the orthodontic appliance 100. In one embodiment, a first tie-wing 118 is supported by a first tie wing support arm 52a and a second tie-wing 118 is supported by a second tie-wing support arm 52b. For instance, the orthodontic appliance could include "single tie-wing" brackets (now shown) and each support arm 52a, 52b is positioned to engage with a single tie-wing on either side of the bracket.

In another embodiment, as illustrated, the orthodontic appliance 100 could include "twin tie-wing" brackets. In this embodiment, a fourth tie-wing 118d is supported by a first tie wing support arm 52a, a third tie-wing 118c is supported by a second tie wing support arm 52c, and a first tie-wing 118a and a second tie-wing 118b are both supported by a second tie support arm 52b. The platform portion 56 of a tie-wing support arm 52a, 52b, 52c engages with the undercut 116a, 116b, 116c, 116d of a tie-wing 118a, 118b, 118c, 118d. For example, on one side, the platform portion 56a of the first tie-wing support arm 52a engages the undercut 116d of the fourth tie wing 118d. The platform portion 56c of the third tie-wing support arm 52c engages the undercut 116c of the third tie wing 118c. On the other side, the platform portion 56b of the second tie-wing support arm 52b engages with both the undercut 116a of the first tie-wing 118 and the undercut 116b of the second tie-wing 118. This configuration ensures that the bonding surface 106 and the layer of adhesive 107 do no contact the inside of the cavity 202.

When the door 130 of the appliance 100 is moved from the closed position to the open position, the door 130 slides along the guide rails 115, and the strut 140 slides between the platform portions 56a, 56c. While the strut 140 is between the platform portions, the orthodontic appliance is retained between the support arms 52a, 52b, 52c, and prevented from moving in the mesial-distal direction. In a preferred embodiment, the appliance 100 is shipped in the packaging 200 with the door 130 opened to allow the practitioner to remove the appliance 100 from the packaging and directly place the appliance on the tooth of a patient with the layer of adhesive 107. The arch wire is then positioned into the slot 108 and the door 130 is closed afterwards.

To help facilitate the removal of the appliance 100 from substrate 200, the amount of force to hold the packaging base 50 within the cavity 202 is greater than the support arms 52a, 52b, 52c retaining the orthodontic appliance 100. That way, the practitioner can remove the orthodontic appliance 100 from the packaging base 50, but the packaging base 50 remains firmly within the cavity. The retention ribs 204 assist with keeping the packaging base 50 in its place. Also, the base portion 51 is sized to press fit within the bottom of the cavity 202.

Figure 9:
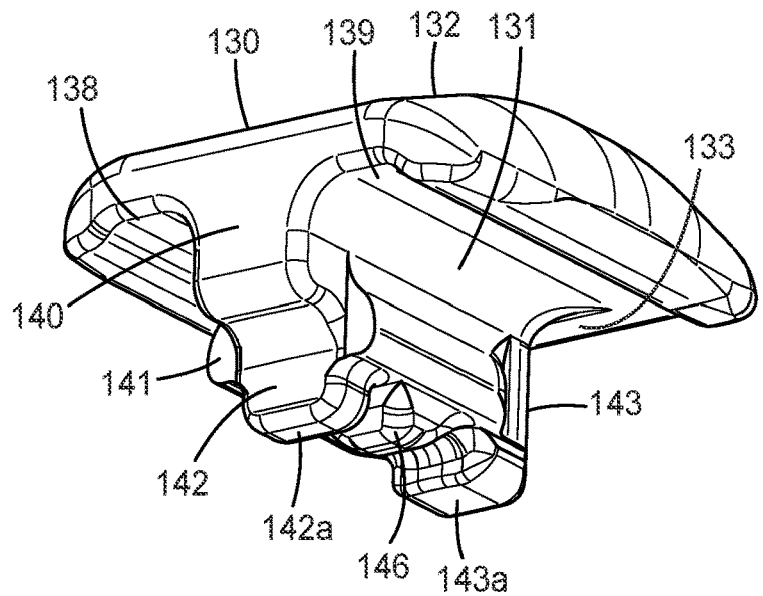
FIG. 9 is a perspective view of the door the appliance of FIG. 1, looking toward its occlusal, lingual, and mesial sides.
Figure 10:
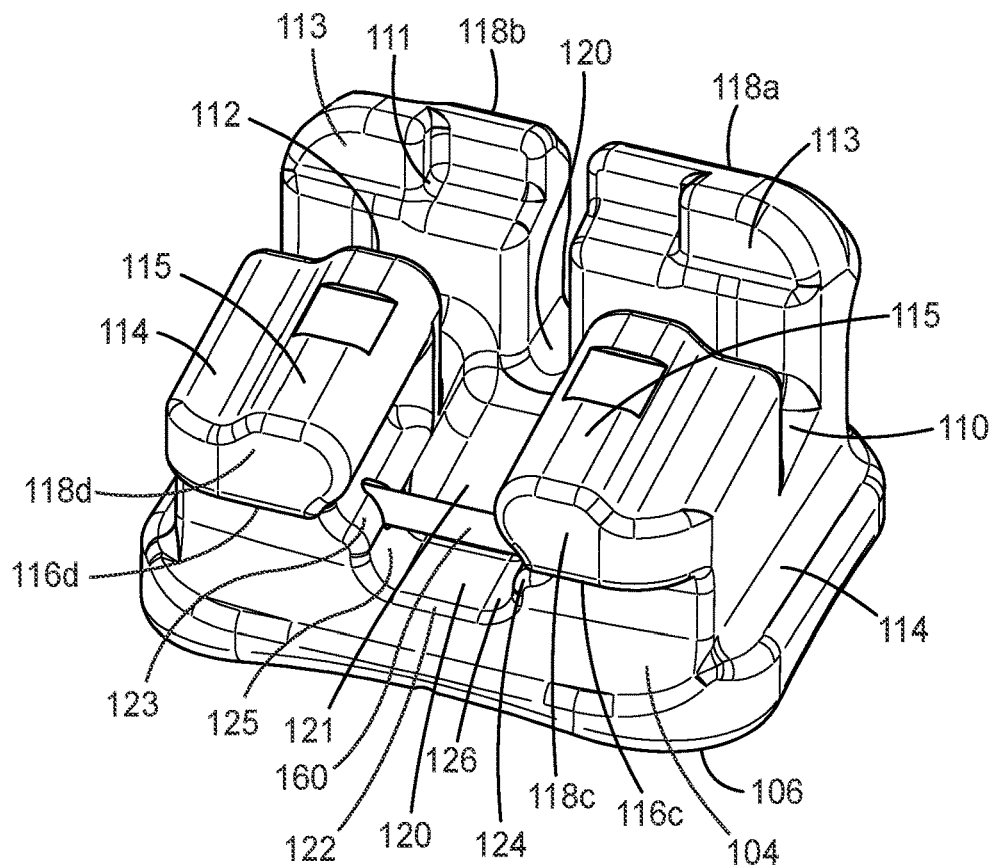
FIG. 10 is a perspective view of the orthodontic appliance with its door removed according to one embodiment, looking toward its facial, occlusal, and mesial sides.

FIGS. 9 and 10 are perspective views of the door 130 and the appliance 100 with the door 130 removed. The body 104 has a pair of opposing guiderails 115 on the occlusal portion of the facial surface of the body 104. Each guiderail 115 extends along a generally occlusal-gingival direction with one of the mesial and distal sides of a channel 120. The door 130 includes complementary grooves 138, 139 that slide along the guiderails 115 as force is applied to the door in a generally occlusal-gingival direction, as further described below. As one skilled in the art can appreciate, there may be appropriate tolerances between the guiderails 115 and the grooves 138, 139 to facilitate sliding of the door 130 and avoid binding.

A compound vertical channel 120 extends from the gingival side to the occlusal side of the body 104. The channel 120 runs between the tie-wings 118a, 118b and rails 115, essentially splitting the body 104 into mesial and distal halves. The channel 120, as depicted, may include a narrower mesial-distal thickness on the gingival side of the arch wire slot 108. On the side of the body 104 occlusal to the arch wire slot 108, the channel 120 includes a main channel section 121 and opposing concave recesses 123, 124 extending along a portion of the length to the channel 120. In the depicted embodiment, the concave recesses 123, 124 are formed in door support sections 114 of the body 104 above the bottom wall 122 of the channel 120, leaving wall sections 125 and 126 between each recess and bottom wall 122. Though depicted as concave, the recesses 123, 124 may comprise different cross-sectional shapes (e.g., rectangular, trapezoidal, square, etc.) to accommodate a given door 130 configuration. In presently preferred circumstances, however, the recesses are concave to facilitate sliding of the door 130 between open and closed positions.

The recesses 123, 124 are open to the occlusal end of the channel 120 and are dimensioned to receive complementary rails 141 on the door 130. The open occlusal end of both the channel 120 and the recesses 123, 124 allows the appliance 100 to be assembled by sliding the door 130 in a generally gingival direction into the body 104 and disassembled by sliding the door 130 in a generally occlusal direction. The recesses 123, 124 are open towards their respective gingival ends, in that the recesses 123, 124 at least partially open into the arch wire slot 108. In certain implementations, and as depicted, the recesses 123, 124 can be open on both their respective occlusal and gingival ends, with the appliance assembly relying on other means, such as the beam described below, of limiting unwanted sliding of the door 130 relative to the body 104. Alternatively, the recess 123, 124 can be closed toward their respective gingival ends and terminate at wall 112. Closed-ended recesses 123, 124 of this nature can provide a slide-limit (i.e., positive stop surface) to the door, preventing portions of the door 130 from contacting an arch wire seated in the arch wire slot 108.

In some embodiments, the channel 120 at least partially defines a frangible web located between the bottom wall 122 and the bonding surface 106 and enables the appliance to be conveniently squeeze-debonded by fracturing a frangible web and pivoting the mesial and distal halves of the appliance 100 toward each other. Further options and advantages are described in issued U.S. Pat. No. 5,366,372 (Hansen, et al.).

Various mechanisms can be implemented within the channel 120 to toggle the door 130 between discrete positions—for example, between open and closed positions. Temporary latch mechanisms that provide local equilibrium positions for the door 130 can advantageously prevent the door 130 from spontaneously closing when a treating professional is placing an arch wire in the slot 108 or conversely, spontaneously opening during the course of treatment. In the depicted embodiment, the latch is a deflectable beam 160 extending in a mesial-distal direction across a portion of the channel 120, generally perpendicular to the direction of sliding for the door 130.

The deflectable beam 160 is spaced from the occlusal entrance to the channel 120, and is received in an appropriate sized hole or lateral channel that extends through at least one of the mesial and distal door support section 114 of the body 104. In some embodiments, the lateral channel extends through both the mesial and distal door support section 114 thereby splitting the channel into two channel sections (i.e., mesial and distal), but this does not have be the case. The beam 160 can extend through all or a portion of each channel section. In one particularly advantageous implementation, the beam extends through portions of the lateral channel in both mesial and distal door support sections 114. One end of the beam 160 can be fixed in a mesial or distal section of the channel using an adhesive or the like, leaving the other end free in the opposite channel section.

In the assembly of the door 130, the beam 160 functions as a latch by resiliently deflecting toward the bottom wall of the channel 120 to permit passage of the door 130 as it is urged in an occlusal direction against the beam 160. The beam 160 accordingly acts to prevent inadvertent occlusal-gingival movement of the door, particularly between open and closed positions. Additional aspects of the interaction between the door 130 and the beam 160 are discussed in detail in PCT Published Application No. 2018/005072 titled "Self-Ligating Orthodontic Bracket," which is hereby incorporated by reference.

The door 130 includes a surface 131 opposite a facial surface 132. The door has mesial-distal width that substantially matches the overall mesial-distal width of the appliance 100. The door 130 includes a gingival edge region 133 that extends over the arch wire slot 108 when the door 130 is in a closed position (See FIG. 2B). The edge region 133 extends essentially the full mesial-distal length of the arch wire slot 108. A portion of the edge region 133 may abut wall surfaces 113 of the body adjacent the gingival wall 111 of the arch wire slot 108 when the door is in the close position.

An enlarged strut 140 extends outwardly from the surface 131 of the door 130. As assembled, the strut 140 is received in the channel 120 between door support sections 114 of the appliance body (See for example FIG. 4). The strut includes an occlusal leading edge 142 and a gingival trailing edge 143, each extending towards the bottom 122 of channel 120. Though a single strut 140 is depicted, alternative appliance configurations may include two struts extending into the channel 120 as assembled. The strut 140 extends in a lingual direction from a mesial-distal center region of the door 140, giving the door 130 a generally "T-shaped" appearance when viewed.

The strut 140 includes a pair of rails 141 that extend along opposite mesial and distal sides, offset from the surface 131. Each rail 141 is dimensioned to be slidingly received in a corresponding mesial and distal recess 123, 124 in channel 120. Though depicted as generally convex, the rails 141 may comprise different cross-sectional shapes (e.g., rectangular, trapezoidal, square, etc.) to accommodate a given recess 123, 124 configuration. In the preferred implementations, however, the opposing rails 141 add strength to the door structure, and guard against undesired rotation of the door due to facially-directed forces from a seated arch wire. This independent interaction between the rail and recess, while not necessarily essential, helps increase tolerance for small gaps that may be present between the door 130 and body 104, and other minor manufacturing irregularities.

Upon initial assembly and when sufficient force is applied to the door 130 in a generally occlusal direction, the protrusion edge projection 142a presses against the beam 160, causing it to deflect downwards (i.e. in a lingual direction) and permit the strut 140 to proceed further into the channel 140. In this position, the beam 160 is disposed in the gingival depression 144 and protrusion 146 is disposed on an occlusal side of the beam 160 (See FIG. 6A). Here, the beam 160 is constrained in an equilibrium position between the leading-edge projection 142a and the protrusion 146. The appliance 100 is now in assembled form, with the door 130 in its opened position.

The leading-edge projection 142a acts as a positive stop surface, preventing occlusal movement and disassembly of the door 130 without sufficient, desired force. The occlusal surface of leading edge projection 142a can include convex curvature relative to the beam 160, including compound convex curvature in certain preferred embodiments. In implementations with compound curvature, the convex occlusal surface may present a continuously curved surface or may include a flat land area adjacent a mesial-distal center. In such implementations, the mesial and distal edges of the occlusal surface will typically include a greater radius of curvature relative to other areas of the occlusal surface. When the door 130 is open, the occlusal surface will be disposed directly adjacent the gingival surface of the beam 160. The presence of curvature on this surface can serve to dissipate forces from the beam 160 on edge projection 142a in the event the door is pulled in an occlusal direction. Transfer of force across the curved occlusal surface can prevent the leading-edge projection 142a from fracturing and substantially disrupting operation of the door and consequently the patient's treatment.

From this configuration, additional force can be applied to the door 130 in a gingival direction to close the door 130 and limit facial access to the arch wire slot 108. Upon reaching a threshold amount of force, the beam 160 can resiliently deflect to allow passage of the protrusion 146 into a second position. In this position, beam 160 is disposed below the occlusal depression 145 and the protrusion 146 is located on the gingival side of the beam 160. Here, the beam 160 can be constrained in a second equilibrium position between the protrusion 146 and the trailing edge projection 143a. With the protrusion 146 gingival to the beam 160, the door 130 is closed. The trailing edge projection 143a prevents further movement of the door 130.

Once again, the process of opening and closing the door 130 can be made reversible because of the resilient nature of the beam 160. As the treating professional imparts occlusal and gingival forces to open and close the door 130, the beam 160 is deflectable towards the bottom wall 122 of the channel 120, thereby allowing the protrusion 146 to toggle between residing on the gingival and occlusal sides of the beam 160, respectively.

In exemplary embodiments, some or all the base 102, body 104, and door 110 are made from a translucent ceramic material. Particularly preferred ceramic materials include the fine-grain polycrystalline alumina materials described in issued U.S. Pat. No. 6,648,638 (Castro, et al.). These ceramic materials are known for their high strength and provide superior aesthetics compared with metallic materials because they transmit light and can visually blend in with the color of the underlying tooth surface. In other embodiments, the base 102 and body 104 may be integrally made, for example, via machine or mold from a polymeric material as disclosed in U.S. Pat. No. 4,536,154 (Garton, et al.), or a polymer-ceramic composite such as glass-fiber reinforced polymeric composites as disclosed in U.S. Pat. No. 5,078,596 (Carberry, et al.) and U.S. Pat. No. 5,254,002 (Reher, et al.). Other suitable materials include, for example, metallic materials (such as stainless steel, titanium, and cobalt-chromium alloys) and plastic materials (such as fiber-reinforced polycarbonate), and combinations thereof. As an example, an appliance can include a base 102 and body 104 made from ceramic material, and the door 110 made from a polymeric composite; other material iterations and combinations are other possible.

Figure 11:
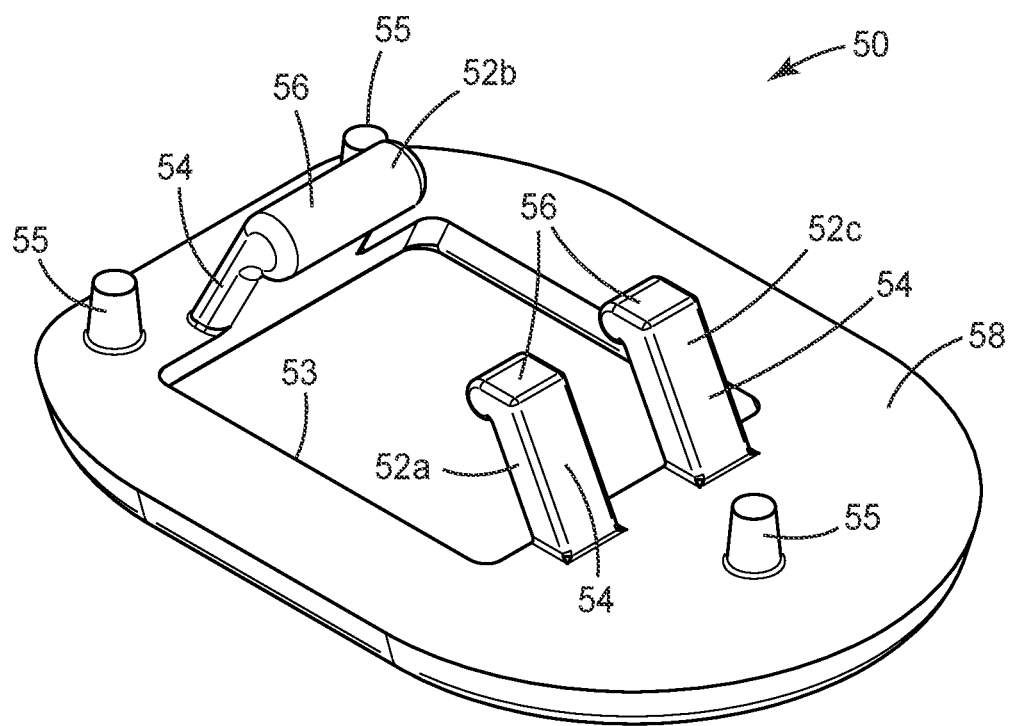
FIG. 11 is a perspective view of a packaging base according to another embodiment

FIG. 11 illustrates another embodiment of a packaging base 50 for an orthodontic appliance. In this embodiment, the packaging base 50 is essentially the same as the packaging base described in reference to FIG. 3, except that that the second tie wing support arm 52b is larger and extends more along the width of one side of the orthodontic appliance. For example, the platform portion 54 is a long cylindrical portion that is designed to engage with two tie-wings on one side of the orthodontic appliance. Also, the lift portion extends at least half of the width of the hole 53. Although FIGS. 3 and 11 illustrate two different configurations of the packaging base 50, one skilled in the art may envision other configurations of packaging bases within the scope of the invention.

Embodiments

Embodiment 1 is a packaged orthodontic appliance, comprising: an orthodontic appliance comprising: a base having a bonding surface; a body extending from the base, wherein the body includes a mesial-distally extending arch wire slot having a bottom wall; a door coupled to the body, wherein the door is movable between an open position and a closed position; and a first tie-wing including a first undercut and a second tie-wing including a second undercut; and a packaging base including first and second tie-wing support arms, wherein the first tie-wing support arm supports the first tie-wing, and the second tie-wing support arm supports the second tie-wing.

Embodiment 2 is the packaged orthodontic appliance of embodiment 1, wherein the door is in the open position, and the door of the orthodontic appliance is retained between the support arms, such that the orthodontic appliance is prevented from moving.

Embodiment 3 is the packaged orthodontic appliance of embodiment 1-2, wherein an arch wire can be ligated in the arch wire slot when the door is the open position, and wherein an arch wire can be retained in the arch wire slot when the door is in the closed position.

Embodiment 4 is the packaged orthodontic appliance of embodiments 1-3, wherein the orthodontic appliance further includes a bonding surface extending from the base opposite the body, and includes a layer of orthodontic adhesive on the bonding surface.

Embodiment 5 is the packaged orthodontic appliance of embodiment 4, wherein the first and second tie-wing support arms support the orthodontic appliance such that the layer of adhesive on the bonding surface of the orthodontic appliance does not contact the packaging base.

Embodiment 6 is the packaged orthodontic applicant of embodiments 1-5, wherein the packaging base includes a third tie-wing support arm, wherein the first tie-wing support arm supports the first tie-wing, and the second and third tie-wing support arms support the second tie-wing.

Embodiment 7 is the packaged orthodontic appliance of embodiment 1-6, wherein the door is in the open position, and the door of the orthodontic appliance is retained between the support arms, such that the orthodontic appliance is prevented from moving in the mesial-distal directions.

Embodiment 8 is the packaged orthodontic appliance of embodiment 1-7 further including a preformed plastic substrate including a plurality of cavities for receiving a plurality of the packaging bases with the orthodontic appliances supported therein.

Embodiment 9 is the packaged orthodontic appliance of embodiment 8, wherein the force to remove the orthodontic appliance from the tie-wing support arms is less than the force to retain the packaging base within the cavity, when the door is in the open position.

Embodiment 10 is the packaged orthodontic appliance of embodiments 1-9 further comprising a preformed plastic substrate to which the packaging base is attached, wherein while the door is in the open position the orthodontic appliance may be removed from the tie-wing support arms of the packaging base without the removal of the packaging base from the preformed plastic substrate.

Embodiment 11 is the packaged orthodontic appliance of embodiment 10, wherein each cavity includes retention ribs to engage with the packaging base.

Embodiment 12 is the packaged orthodontic appliance of embodiments 1-11, where the door is slideably coupled to the body, wherein the door is slideable between an open position and a closed position Embodiment 13 is the packaged orthodontic appliance of embodiments 1-12, wherein the orthodontic appliance further includes a channel in the body orientated generally perpendicular to the arch wire slot, and wherein the door further includes a strut extending from a lingual surface, wherein the strut is slideably received in the channel.

Embodiment 14 is the packaged orthodontic appliance of embodiments 1-13, wherein the tie-wing support arms include a lift portion and a platform portion, wherein the platform portions are engaged with the tie-wing undercuts.

Embodiment 15 is the packaged orthodontic appliance of embodiments 1-14 further comprising a preformed plastic substrate to which the packaging base is attached, wherein the substrate is substantially opaque to the transmission of light in the range of about 400 nanometers to about 600 nanometers, in that the substrate blocks greater than 50% of the transmission of light (actinic radiation) in the range of about 400 nanometers to about 600 nanometers.

Embodiment 16 is the packaged orthodontic appliance of embodiments 1-15 further comprising a preformed plastic substrate to which the packaging base is attached, wherein the substrate provides a substantial barrier to moisture.

Embodiment 17 is the packaged orthodontic appliance of embodiments 1-16 further including a preformed plastic substrate, wherein the preformed plastic substrate includes a plurality of cavities for receiving a plurality of the packaging bases with the orthodontic appliances supported therein, wherein the cavities are shaped similarly to the shape of the packaging base.

Embodiment 18 is the packaged orthodontic appliance of embodiments 1-17, wherein the orthodontic appliance further includes a third tie-wing and a fourth tie-wing, wherein the first support arm supports both the first tie-wing, the second support arm supports both the second and third tie-wing, and the third support arm supports the fourth tie-wing.

Embodiment 19 is an alternative packaged orthodontic appliance, comprising: an orthodontic appliance comprising: a base having a bonding surface; a body extending from the base, wherein the body includes a mesial-distally extending arch wire slot having a bottom wall; a channel in the body orientated generally perpendicular to the arch wire slot; a door slideably coupled to the body, wherein the door is slideable between an open position and a closed position wherein the door further includes a strut extending from a lingual surface, wherein the strut is slideably received in the channel; a first tie-wing including a first undercut and a second tie-wing including a second undercut; a bonding surface extending from the base opposite the body; and a layer of orthodontic adhesive on the bonding surface and a packaging base including first and second tie-wing support arms, wherein the first tie-wing support arm supports the first tie-wing, and the second tie-wing support arm supports the second tie-wing; wherein the door is in the open position, and the door of the orthodontic appliance is retained between the support arms, such that the orthodontic appliance is prevented from moving; wherein an arch wire can be ligated in the arch wire slot when the door is the open position, and wherein an arch wire can be retained in the arch wire slot when the door is in the closed position; wherein the first and second tie-wing support arms support the orthodontic appliance such that the layer of adhesive on the bonding surface of the orthodontic appliance does not contact the packaging base.

Embodiment 20 is yet another alternative packaged orthodontic appliance, comprising: an orthodontic appliance comprising: a base having a bonding surface; a body extending from the base, wherein the body includes a mesial-distally extending arch wire slot having a bottom wall; a door slideably coupled to the body, wherein the door is slideable between an open position and a closed position; a first tie-wing including a first undercut and a second tie-wing including a second undercut, wherein the tie-wing support arms include a lift portion and a platform portion, wherein the platform portions are engaged with the tie-wing undercuts; a bonding surface extending from the base opposite the body; and a layer of orthodontic adhesive on the bonding surface; and a packaging base including first and second tie-wing support arms, wherein the first tie-wing support arm supports the first tie-wing, and the second tie-wing support arm supports the second tie-wing; wherein the door is in the open position, and the door of the orthodontic appliance is retained between the support arms, such that the orthodontic appliance is prevented from moving; wherein an arch wire can be ligated in the arch wire slot when the door is the open position, and wherein an arch wire can be retained in the arch wire slot when the door is in the closed position; wherein the first and second tie-wing support arms support the orthodontic appliance such that the layer of adhesive on the bonding surface of the orthodontic appliance does not contact the packaging base; and a preformed plastic substrate including a plurality of cavities for receiving a plurality of the packaging bases with the orthodontic appliances supported therein, wherein each cavity includes retention ribs to engage with the packaging base; wherein the force to remove the orthodontic appliance from the tie-wing support arms is less than the force to retain the packaging base within the cavity, when the door is in the open position.

What is claimed is:

1. A packaged orthodontic appliance, comprising:
   a base having a bonding surface;
   a body extending from the base, wherein the body includes a mesial-distally extending arch wire slot having a bottom wall;
   a door coupled to the body, wherein the door is movable between an open position and a closed position; and
   a first tie-wing including a first undercut and a second tie-wing including a second undercut; and
   a packaging base including a planar surface and a first, a second, and a third tie-wing support arm, wherein the first, second, and third support arms are independent from one another and extend from the planar surface of the packaging base at a fixed, acute angle relative to the planar surface, wherein the first tie-wing support arm supports the first tie-wing, and the second and third tie-wing support arms support the second tie-wing, wherein the second and third support arms are disposed near an opposite side of the base from the first support arm, and wherein the second and third arms are entirely separate between the base and the second tie-wing.

2. The packaged orthodontic appliance of claim 1, wherein the door is in the open position, and the door of the orthodontic appliance is retained between the support arms, such that the orthodontic appliance is prevented from moving.

3. The packaged orthodontic appliance of claim 1, wherein an arch wire can be ligated in the arch wire slot when the door is the open position, and wherein an arch wire can be retained in the arch wire slot when the door is in the closed position.

4. The packaged orthodontic appliance of claim 1, wherein the orthodontic appliance further includes a bonding surface extending from the base opposite the body, and includes a layer of orthodontic adhesive on the bonding surface.

5. The packaged orthodontic appliance of claim 4, wherein the first and second tie-wing support arms support the orthodontic appliance such that the layer of adhesive on the bonding surface of the orthodontic appliance does not contact the packaging base.

6. The packaged orthodontic appliance of claim 1, wherein the door is in the open position, and the door of the orthodontic appliance is retained between the support arms, such that the orthodontic appliance is prevented from moving in the mesial-distal directions.

7. The packaged orthodontic appliance of claim 1 further including a preformed plastic substrate including a plurality of cavities for receiving a plurality of the packaging bases with the orthodontic appliances supported therein.

8. The packaged orthodontic appliance of claim 7, wherein the force to remove the orthodontic appliance from the tie-wing support arms is less than the force to retain the packaging base within the cavity, when the door is in the open position.

9. The packaged orthodontic appliance of claim 1 further comprising a preformed plastic substrate to which the packaging base is attached, wherein while the door is in the open position the orthodontic appliance may be removed from the tie-wing support arms of the packaging base without the removal of the packaging base from the preformed plastic substrate.

10. The packaged orthodontic appliance of claim 9, wherein each cavity includes retention ribs to engage with the packaging base.

11. The packaged orthodontic appliance of claim 1, where the door is slideably coupled to the body, wherein the door is slideable between the open position and the closed position.

12. The packaged orthodontic appliance of claim 1, wherein the orthodontic appliance further includes a channel in the body orientated generally perpendicular to the arch wire slot, and wherein the door further includes a strut extending from a lingual surface, wherein the strut is slideably received in the channel.

13. The packaged orthodontic appliance of claim 1, wherein the tie-wing support arms include a lift portion and a platform portion, wherein the platform portions are engaged with the tie-wing undercuts.

14. The packaged orthodontic appliance of claim 1 further comprising a preformed plastic substrate to which the packaging base is attached, wherein the substrate blocks greater than 50% of the transmission of actinic radiation light in the range of about 400 nanometers to about 600 nanometers.

15. The packaged orthodontic appliance of claim 1 and further comprising a hole defined in the base, and wherein the first support arm is disposed on a first side of the hole and the second and third support arms are positioned on a second side of the hole that opposes the first side of the hole.

16. The packaged orthodontic appliance of claim 1 further including a preformed plastic substrate, wherein the preformed plastic substrate includes a plurality of cavities for receiving a plurality of the packaging bases with the orthodontic appliances supported therein, wherein the cavities are shaped similarly to the shape of the packaging base.

17. The packaged orthodontic appliance of claim 1, wherein the orthodontic appliance further includes a third tie-wing and a fourth tie-wing, wherein the first support arm supports both the first tie-wing, the second support arm supports both the second and third tie-wing, and the third support arm supports the fourth tie-wing.

18. A packaged orthodontic appliance, comprising:
an orthodontic appliance comprising:
a base having a bonding surface;
a body extending from the base, wherein the body includes a mesial-distally extending arch wire slot having a bottom wall;
a channel in the body orientated generally perpendicular to the arch wire slot;
a door slideably coupled to the body, wherein the door is slideable between an open position and a closed position wherein the door further includes a strut extending from a lingual surface, wherein the strut is slideably received in the channel;
a first tie-wing including a first undercut and a second tie-wing including a second undercut;
a bonding surface extending from the base opposite the body; and
a layer of orthodontic adhesive on the bonding surface and
a packaging base including a planar surface, and a first, a second, and a third tie-wing support arm, wherein the first, second, and third support arms are independent from one another and each extend from the planar surface of the packaging base at a fixed, acute angle relative to the planar surface to a platform, wherein the platform of the first tie-wing support arm supports the first tie-wing, and the platform of the second and third tie-wing support arms support the second tie-wing and wherein the second and third support arms are disposed near an opposite side of the base from the first support arm, and wherein the second and third arms are entirely separate between the base and the second tie-wing,
wherein the door is in the open position, and the door of the orthodontic appliance is retained between the support arms, such that the orthodontic appliance is prevented from moving;
wherein an arch wire can be ligated in the arch wire slot when the door is the open position, and wherein an arch wire can be retained in the arch wire slot when the door is in the closed position;
wherein the first and second tie-wing support arms support the orthodontic appliance such that the layer of adhesive on the bonding surface of the orthodontic appliance does not contact the packaging base.

* * * * *

UNITED STATES PATENT AND TRADEMARK OFFICE
CERTIFICATE OF CORRECTION

| | |
|---|---|
| PATENT NO. | : 11,723,752 B2 |
| APPLICATION NO. | : 16/970677 |
| DATED | : August 15, 2023 |
| INVENTOR(S) | : Bruce R Broyles |

It is certified that error appears in the above-identified patent and that said Letters Patent is hereby corrected as shown below:

In the Claims

<u>Column 14</u>
Line 53, In Claim 3, delete "door is the open position" and insert -- door is in the open position --, therefor.

Signed and Sealed this
First Day of October, 2024

Katherine Kelly Vidal
*Director of the United States Patent and Trademark Office*